(12) United States Patent
Lindner

(10) Patent No.: US 12,391,201 B2
(45) Date of Patent: Aug. 19, 2025

(54) EXPANDED TUBE FOR A MOTOR VEHICLE CRASH BOX AND MANUFACTURING METHOD FOR IT

(71) Applicant: Outokumpu Oyj, Helsinki (FI)

(72) Inventor: Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 281 days.

(21) Appl. No.: 17/759,227

(22) PCT Filed: Jan. 28, 2021

(86) PCT No.: PCT/EP2021/051994
§ 371 (c)(1),
(2) Date: Jul. 21, 2022

(87) PCT Pub. No.: WO2021/152015
PCT Pub. Date: Aug. 5, 2021

(65) Prior Publication Data
US 2023/0060627 A1 Mar. 2, 2023

(30) Foreign Application Priority Data
Jan. 28, 2020 (EP) .................................. 20154182

(51) Int. Cl.
*B60R 19/34* (2006.01)
*B60R 19/03* (2006.01)
*F16F 7/12* (2006.01)
*B21C 37/08* (2006.01)
*B21C 37/16* (2006.01)

(52) U.S. Cl.
CPC .............. *B60R 19/34* (2013.01); *B60R 19/03* (2013.01); *F16F 7/125* (2013.01); *B21C 37/0803* (2013.01); *B21C 37/16* (2013.01)

(58) Field of Classification Search
CPC ................................ B60R 19/34; F16F 7/125
USPC .......................................... 293/133; 188/377
See application file for complete search history.

(56) References Cited

U.S. PATENT DOCUMENTS

| | | | | |
|---|---|---|---|---|
| 3,998,485 A | * | 12/1976 | Putter | ..................... B60R 19/34 293/133 |
| 6,282,769 B1 | | 9/2001 | Longo | |
| 6,386,347 B1 | | 5/2002 | Reynaert | |
| 6,702,345 B1 | * | 3/2004 | Yoshida | .................. B60R 19/34 293/133 |

(Continued)

FOREIGN PATENT DOCUMENTS

| | | |
|---|---|---|
| DE | 854157 C | 10/1952 |
| DE | 20 2006 018616 U1 | 4/2008 |

(Continued)

OTHER PUBLICATIONS

Machine Translation of JP2011011661A, printed Sep. 21, 2024.*

*Primary Examiner* — Jason S Morrow
(74) *Attorney, Agent, or Firm* — Quinn IP Law

(57) ABSTRACT

The present invention relates to a motor vehicle crash box with a working direction in vehicle's longitudinal axis manufactured out of a tube which is expanded into different zones, wherein the zones are different in strength and diameter by using steel after forming a homogenous austenitic microstructure with a strain hardening effect. The present invention further relates to the manufacturing method of such a component.

14 Claims, 3 Drawing Sheets

(56) References Cited

U.S. PATENT DOCUMENTS

| | | | | |
|---|---|---|---|---|
| 6,802,548 B2* | 10/2004 | Shimotsu | | B60R 19/34 |
| | | | | 293/133 |
| 6,942,262 B2* | 9/2005 | Glasgow | | B60R 19/34 |
| | | | | 296/187.03 |
| 7,182,191 B2* | 2/2007 | Scott | | B60N 2/231 |
| | | | | 188/372 |
| 7,225,660 B1* | 6/2007 | Ledebur | | B21D 41/02 |
| | | | | 72/123 |
| 7,393,029 B2* | 7/2008 | Glasgow | | B60N 2/4235 |
| | | | | 293/132 |
| 7,788,959 B2* | 9/2010 | Hayashi | | B21C 25/04 |
| | | | | 72/283 |
| 8,141,404 B2* | 3/2012 | Newport | | B21D 53/88 |
| | | | | 72/370.14 |
| 8,262,151 B2* | 9/2012 | De Queiroz | | B60R 19/34 |
| | | | | 296/187.01 |
| 8,276,955 B2* | 10/2012 | Baccouche | | B60R 19/34 |
| | | | | 293/133 |
| 8,359,893 B2* | 1/2013 | Pascual Barrio | | B60R 19/34 |
| | | | | 72/370.14 |
| 8,746,763 B2* | 6/2014 | Wavde | | B60R 19/34 |
| | | | | 293/133 |
| 9,663,051 B2 | 5/2017 | Rabe et al. | | |
| 9,707,614 B2* | 7/2017 | Katsumura | | G06F 30/23 |
| 11,104,283 B2* | 8/2021 | Yatsunami | | B60R 19/34 |
| 11,932,926 B2* | 3/2024 | Oliver | | C22C 38/02 |
| 11,959,159 B2* | 4/2024 | Kim | | C21D 6/004 |
| 12,070,783 B2* | 8/2024 | Steinmetz | | B21C 37/16 |
| 2003/0057720 A1 | 3/2003 | Nees et al. | | |
| 2011/0291431 A1 | 12/2011 | Buschsieweke | | |
| 2013/0048455 A1 | 2/2013 | Friedrich | | |
| 2013/0119705 A1 | 5/2013 | Matuschek et al. | | |
| 2015/0114073 A1 | 4/2015 | Katsumura et al. | | |
| 2017/0113638 A1 | 4/2017 | Ahuja et al. | | |
| 2017/0210319 A1 | 7/2017 | Fuerst et al. | | |
| 2019/0076902 A1* | 3/2019 | Mizumura | | B21K 1/12 |
| 2019/0152415 A1* | 5/2019 | Tung | | F16F 7/12 |
| 2020/0108788 A1* | 4/2020 | Sportelli | | B60R 19/03 |
| 2023/0416889 A1* | 12/2023 | Wu | | C22C 38/44 |

FOREIGN PATENT DOCUMENTS

| | | |
|---|---|---|
| EP | 2765014 A1 | 8/2014 |
| JP | 2011011661 A | 1/2011 |
| WO | 2005/021326 A2 | 3/2005 |
| WO | 2011073049 A1 | 6/2011 |

* cited by examiner

EXPANDED TUBE FOR A MOTOR VEHICLE CRASH BOX AND MANUFACTURING METHOD FOR IT

FIELD OF THE INVENTION

The present invention relates to a motor vehicle crash box with a working direction in the longitudinal axis of the motor vehicle. The present invention further relates to the manufacturing method of such a component.

BACKGROUND

State-of-the-art motor vehicles are equipped at each end of their length or longest dimension (front and rear ends) with energy absorption elements as crash-protection parts. Such elements are called crash-management systems or bumper systems and are typically attached to one another by one cross member connected with two state-of-the-art crash boxes, which in turn are connected with the car body construction. Thereby, the crash boxes absorb kinetic crash energy during an impact. The crash boxes are irreversibly plastically deformed by compressing or folding. As a result, the car body itself should be protected without any structural damage or distortion.

The component crash box as one part of the motor vehicle typically has different, partially seemingly contrary properties like enabling high crash-safety while at the same time being light in weight to reduce fuel consumption and thereby reduce $CO_2$ emissions, and being cost-effective. Moreover, the crash box provides protection to pedestrians. Further requirements for this component are easy assembly with the neighboring parts, optimal space utilization and the component should be easily replaceable after an impact. The "Research Council for Automobile Repairs" developed a test scenario called RCAR crash test to evaluate damage and repairing costs after rear-impact crashes and collisions at lower speed levels. The result of such tests has a direct influence on the insurance rating of passenger vehicles and is therefore of considerable interest to end-users.

Several different geometrical shapes have been used for the design of crash boxes for motor vehicles. Circular and polygonal tubes as well as modular designs with multi-chamber profiles or box-shape constructions which can be conically tapered in the longitudinal direction of the component. While homogeneous tube profiles provide constant force absorption, the resistance against cross-forces and bending torque is lower than for profiles of other geometries. Tubes present the easiest producible and therefore most cost-effective geometry for crash boxes.

In response to the increasing demands of crash test authorities such as Euro NCAP and U.S. NCAP extensive profile forms provided by two half-shells set together and divided into different length zones are most common today. To enable the required crash behavior, dimples or corrugations are introduced into the crash boxes by homogeneous folding. The forming of dimples or corrugations in the profiles or half shells of the produced crash boxes is a further manufacturing step, increasing the component costs as a direct result.

Various state-of-the-art used solutions exist for combining lightweight and crash safety for crash box components. US patent application publication US2017113638A1 describes a cross member which is made of light metal alloy and configured as a hollow profile to define an interior space and which has a top beam and a bottom beam, with the top beam and/or bottom beam having a recess defined by a marginal area in the form of a collar oriented into an interior space of the cross member. Arranged at an end of the cross member is a crash box formed with a flange sized to overlap at least one region of the cross member in motor vehicle longitudinal direction. A spacer is arranged in the interior space of the cross member and has a chamfer for formfitting engagement by the collar. A fastener is configured for passage of the recess and thereby extending in a motor vehicle vertical direction through the flange of each crash box and the spacer. The usage of light metal alloy hollow profiles is cost expensive and results in manufacturing an expensive component.

In U.S. Pat. No. 9,663,051B2 the crash box is divided into different length zones. The use of a conical configuration combined with the introduction of beads represents an extensive effort during manufacturing of the crash box and results in higher component costs.

Another example of a cost-expensive way of manufacturing a crash box can is provided in US patent application publication 2017210319A1 where a plurality of supporting walls is inserted in the longitudinal direction of the crash box. At least one of the supporting walls is designed as a vault.

US patent application publication 2013119705A1 discloses a crash box system in which a multiple chamber profile is used with the integration of an additional support element as well as a fastening profile. Also the integration of weakening tools and longitudinal rips, known from the US patent application publication 2013048455A1 demonstrates an additional effort during component manufacturing resulting in higher component costs.

US patent application 2011291431A1 describes a crash box using manganese-boron alloyed steel grade, which must be press-hardened and further annealed between 300-450° C. Such grades have the technical disadvantage of being brittle even in their weld zones because of their martensitic microstructure having a significantly lower energy absorption potential than grades with an austenitic, ductile microstructure. Moreover, the manufacturing process of press-hardening plus further annealing results in cost-expensive production with inefficient cycle times, high investment costs and unsatisfactory impact on life cycle assessment. The US patent application 2011291431A1 points out a yield strength level of $R_{p0.2}$=1,150 MPa with an elongation of $A_5$=8%. These values contrast with the requirements of the component being ductile, deformable and lower in strength than the passenger safety cell of the car body well known from Bela Barenyi and its DE patent application 854157C for a passenger compartment. There, the strength decreases constantly or in gradual phases in direction of the front and back end of the vehicle and since then the front compartment and rear end of the car are known as deformable zones.

Most of state-of-the-art used crash box systems are mechanical solutions in order to minimise costs during a repair or replace situation after an impact. Other systems are also available e.g. using sensors known from the international patent application publication WO 2011073049A1. Also, pneumatic or hydraulic damper solutions are generally possible from a technical point of view to fulfill the component requirements.

Summarizing, no state-of-the-art crash box system using a cost-effective tube design exists which fulfills the actual crash requirements as well as todays OEM's demands for lightweight by exploiting target-orientated the strain-hardening characteristic of austenitic steels. Further, there is state-of-the-art no manufacturing process known, using an expanding forming to create a crash box component.

SUMMARY OF THE INVENTION

It is an aim of the present invention to eliminate some drawbacks of the prior art and to provide a lightweight and cost-effective motor vehicle crash box with a working direction in vehicle's longitudinal axis manufactured out of a tube, e.g. a circular tube or polygonal tube, which is expanded into different zones different in strength and diameter by using steel which has a homogenous austenitic microstructure with a strain hardening effect even after forming. Moreover, the crash box of the present invention is easy to assemble and scalable depending on the vehicle model and its dimensions.

The present invention relates to a motor vehicle crash box with a working direction in the longitudinal axis of the motor vehicle, and a manufacturing method thereof. The invention is defined by what is disclosed in the independent claims. Preferable embodiments are set out in the dependent claims.

DETAILED DESCRIPTION

The present invention relates to a motor vehicle crash box with a working direction in vehicle's longitudinal axis manufactured out of a tube, e.g. a circular tube or a polygonal tube, which is expanded into different zones different in strength and diameter by using steel which has even after forming a homogenous one-phase microstructure with a strain hardening effect, for example a homogenous austenitic microstructure. The present invention further relates to the manufacturing method of such a component.

Embodiments describe a motor vehicle crash box. In one embodiment the motor vehicle crash box has a working direction in a vehicle's longitudinal axis. The motor vehicle crash box is manufactured out of a tube which is expanded by a forming process into an expanded tube having at least two zones having different material strength and different geometry. Thus in one embodiment the crash box comprises an expanded tube having at least two zones. Each of the zones has different material strength and a different shape or geometry. In one embodiment, the tube is a circular tube. In a further embodiment the tube is a polygonal tube. For the purposes of the present invention a circular tube is a tube in which both the lumen or inside space of the tube and the outer circumference of the tube are circular and of non-fluctuating diameter. In an embodiment the inside space of the tube has a diameter which is essentially the same along the length of the tube and similarly the tube has an external diameter which is essentially the same along the length of the tube.

In a further embodiment the zones have a strength [N/mm$^2$] to diameter [mm] ratio of 6.0-9.0 N/mm$^3$. The strengths are measured by the method according to DIN EN 10216 in which a steel tensile test of one zone of the tube is carried out under quasi-static conditions at room temperature. The hardening behavior of stable one-phase steel is known from tensile tests according to DIN EN ISO 6892-1:2017-02, which are carried out under flat sheet conditions, quasi-static conditions and a room temperature. Armed with the knowledge of the strain hardening rate of the material in the flat sheet condition, the resulting strength after expanding the tube related to the forming degree can be calculated.

In one embodiment between the different zones is a minimum strength delta of $\Delta Rm \geq 75$ MPa, preferably $\Delta Rm \geq 120$ MPa, measured according to the methods described above. The differences in strengths between the zones are optimized to result in crumple zones for absorbing kinetic crash energy, as described in the following embodiment in which the expanded tube with its different zones is firstly folded by the zone having the smallest diameter, followed by the others depending on the respectively smallest diameter.

In other words, in one embodiment the zones have a foldability which is inversely proportional to the diameter of the zone. This means that the zone with the smallest diameter folds first and the zone with largest diameter folds last on an impact.

In a further embodiment the expanded tube is configured to provide a residual safety area by reaching a block length of the system, preferably $L_B \geq 80$ mm, more preferably $L_B \geq 100$ mm, after impact. This limits the transfer of forces into a passenger compartment of a vehicle.

In one embodiment the center in the longitudinal direction works as a mirror axis and the zones are characterized in a way that starting from the outer-sides to the center, the diameter of the zone decreases towards the center.

In a preferred embodiment at least one end of the expanded tube is widened to provide a flange around the circumference of the end of the tube, the flange being essentially perpendicular to the longitudinal axis of the tube box and its working direction. The flange provides a surface for attaching the crash box to a neighboring vehicle part, for example to a bumper or to the chassis of a car. The flange can be, for example, welded as a fillet on the lap joint or mechanically attached in lap joint condition to the neighboring vehicle parts, for example by screws or other mechanical attachments, like rivets, nails, nuts, bolts etc. Such attachment means provide for easy assembly and minimize costs downstream when installing a crash box in a motor vehicle.

Further embodiments relate to a method of manufacturing a motor vehicle crash box with a working direction in a vehicle's longitudinal axis. In one embodiment the tube is manufactured as a longitudinal-welded tube, preferably by high-frequency welding. Welded tubes in general cost significantly less than cold drawn seamless tubes. Welding, in particular high-frequency welding offers the highest production speed. Further, high-frequency welding has the lowest possible heat input. The heat input in this method is concentrated at the surfaces to be welded. This concentration of the heat input makes the method ideal for welding thin tubes, e.g. tubes having a steel thickness of 0.8 mm $\leq t \leq 2.5$ mm. Thermal distortion is reduced and internal stresses of the tubes are lowered.

In a further embodiment the tube is expanded by a mechanical drift expanding process in a mechanical drift expanding process machine. Mechanical drift expanding process machines are relatively inexpensive. Mechanical drift expanding process machines can be used both for testing quality of weld seams and for carrying out the expanding forming step.

In a preferred embodiment the mechanical drift expanding process machine uses at least two different expanding mandrels for at least two different zones of the crash box. The use of different mandrels optimizes the process.

In a suitable embodiment the mechanical drift expanding process machine has a mirrored longitudinal axis to create a symmetrical crash box.

In one embodiment the tube is manufactured out of strain-hardenable, fully austenitic steels, preferably austenitic stainless steels, having an initial yield strength $R_{p0.2} \geq 380$ MPa and an initial elongation $A_{80} \geq 40\%$, measured by the tensile test according to DIN EN ISO 6892-1: 2017-02 under flat sheet conditions, quasi-static and at room temperature.

In a particular embodiment the tube has an initial thickness of 0.8 mm≤t≤2.5 mm and the ratio of the initial diameter to the thickness is 24≤$r_{d/t}$≤125, more preferably between 40≤$r_{d/t}$≤55. The thickness and diameter may be measured by various means known to those skilled in the art, e.g. with a caliper or with a mechanical outside micrometer, a further method of measuring the diameter could be an optical method, such as a laser distance measurement method. The described thickness and internal diameter ratios are optimal for forming crashboxes for use in passenger cars, trucks, buses or in agricultural vehicles.

Thus, further embodiments relate to uses of expanded tubes. One embodiment describes the use of an expanded tube as a crash box in a motor vehicle. In an embodiment the motor vehicle in which the crash box is integrated is a passenger car, a truck, a bus or an agricultural vehicle. In a further embodiment the motor vehicle in which the crash box is integrated is a battery electric vehicle.

In a further embodiment the crash box is used as an energy absorbing element in a crash barrier, guardrail or inside a railway vehicle.

In accordance with the objective of the present invention, the expanded tube crash box is manufactured out of a longitudinally welded continuous tube, preferably a circular tube whereby the continuous manufactured tube is cut in a first step to the later needed component length. The tube cut to the component length is then expanded by a mechanical drift expanding process from at least one side of the tube, preferably from both ends of the tube. To provide an economically attractive component, the longitudinal welding process is preferably a high-frequency welding process which further provides high ductility and power transmission in the welded zones by using austenitic steels. Alternatively, a laser beam welding process can be used to fulfill the method of the present invention.

The cut tube is expanded by a forming process, preferably by a mechanical drift expanding process, into at least two zones different in material strength and geometry, especially in tube diameter. By using austenitic steels with a cold-formable strain-hardening mechanism, the higher expanded zone with a higher resulting diameter offers a higher strength level. As a resulting behavior during an impact situation in the longitudinal direction of the motor vehicle, the expanded tube crash box will fold together, whereby the zone with the smallest diameter and therefore the lowest strength level will fold first. Because there is at the same time the highest elongation in this zone, the potential for energy absorption which means converting the kinetic impact energy into material-related plastic deformation is at its highest. If the impact force is not relieved by the folding of the first zone, the same effect takes place in the zone with the second smallest diameter and so on. In a low energy impact the zone with the thinnest diameter that has the lowest strength will fold. In impacts with higher energy, zones with increasing diameter and increasing strength will also fold one after another so that energy can be continuously absorbed by the crash box. Thus, the crash box absorbs kinetic impact energy such that the car body and particularly an occupant in the car are not affected.

The resistance against the impact will increase in two ways with the crash box and method of the present invention: Firstly, on a material-related way because the used strain-hardening austenitic steels will increase in strength during the affecting impact because of their hardening mechanism. With this effect, a ratio of yield strength [N/mm²] to diameter of the respective zone [mm] can be defined as design factor for the component engineers. For the method of the present invention with the combination of an expanded tube crash box and strain-hardenable austenitic steels, the ratio is suitable between 6.0-9.0 N/mm³. The resistance against the impact will increase in a second way which is geometry related because the continuous folding of the lower diameter zone into the higher diameter zones results in the effect that more material must be folded during the respective next folding step. At the end, a component condition is reached where a block length $L_B$ is attained which can be defined as a residual safety area at which the maximum resistance against the impact acts. Preferably, the block length of the crash box is reached at a length of $L_B$≥80 mm, more preferably $L_B$≥100 mm.

In a preferred embodiment, there are three zones (1,2,3) having three diameters (d1, d2, d3) respectively, see FIG. 1, whereby the center in longitudinal direction works as a mirror axis. The zones are characterized in a way that starting from the outer-sides to the center, the diameter of the zone decreases. To realize the desired folding behavior of the different zones, it is preferably to construct the diameter in a way that because of the expanding process of the tube, a minimum strength delta between the different zones of ΔRm≥75 MPa, preferably ΔRm≥120 MPa, is performed.

With the above-described way of construction, the necessary machine to perform the expanding of the tube as a mechanical drift expanding process must be adequately adapted to the design requirements. Therefore, the machine is designed with tools having at least two different expanding mandrels for at least two different zones of the crash box. It is preferable that the total mandrel tool is able to shape one side of the mirror axis with one insertion of the tube into the tool. To realize a fast and cost-effective production for high vehicle volumes, it is further preferably that the machine has a mirrored longitudinal axis to create a symmetrical crash box enabling an insertion with mandrel tools from both sides of the longitudinal axis of the tube so that from both sides the tube is expanded simultaneously to its mirror axis.

To enable a connection with the neighboring parts of the crash box, at least one end, but preferably both ends, of the expanded tube is widened to provide a flange around the circumference of the end of the tube, the flange being essentially perpendicular to the longitudinal axis of the tube box and its working direction. The flange provides a surface for attaching the crash box to a neighboring vehicle part, for example to a bumper or to the chassis of a car. The flange can be, for example, welded as a fillet on the lap joint or mechanically attached in lap joint condition to the neighboring vehicle parts, for example by screws or other mechanical attachments, like rivets, nails, nuts, bolts etc. Such attachment means provide for easy assembly and minimize costs downstream when installing a crash box in a motor vehicle.

The benefit of such design is that the position and orientation of the joints is optimized to better resist stresses during an impact from the front or rear of the vehicle.

The initial material form before tube manufacturing is a flat steel with a thickness t≤3.0 mm, preferably between 0.8 mm≤t≤2.5 mm and is typically provided to the tube manufacturer in the form of a coil or a strip. It is further suitable to define a ratio of the initial diameter of the tube to the thickness which is 24≤$r_{d/t}$≤125, preferably between 40≤$r_{d/t}$≤55. It is possible to manufacture single tubes out of sheets or plates, however, the use of strips and coils as starting materials for continuous tube manufacturing provides a cost-effective and large-scaled industrial crash box manufacturing for bigger vehicle volumes. In one embodiment cold-formable and strain-hardenable austenitic steels, preferably stainless steels, having an initial yield strength $R_{p0.2} \geq 380$ MPa and an initial elongation $A_{80} \geq 45\%$ are used. In a further embodiment, stable one-phase austenitic steels are used, fully austenitic even after forming and welding offering a TWIP (Twinning induced Plasticity) strain-hardening effect.

To provide a lightweight crash box combined with good or optimal crash resistance, meaning safety, it is suitable to use high-strength steels with an initial strength level of $R_{p0.2} \geq 380$ MPa, more preferably $R_{p0.2} \geq 450$ MPa. Beside the strength, ductility to expand the tube is also an important property. The ductility of the material is further needed during a crash as energy absorption potential as a key property of the component. The higher the energy absorption of the crash box, the lower the forces and accelerations forward into passenger compartment and thereby on the occupants. Due to the ductility of the crash box material, the crash box can absorb impact energy continuously and softly reducing the forces on an occupant in the vehicle. Therefore, ductility described as elongation after fracture with a value of $A_{80} \geq 40\%$, preferably $A_{80} \geq 50\%$, is suitable for the initial material of the present invention. The needed combination of strength and elongation is given by steels with an austenitic microstructure and a strain-hardening mechanism, especially by austenitic stainless steels, having a chromium content $Cr \geq 10.5\%$. The characteristic of strain-hardening gives the vehicle engineer the possibility to reach the final strength-ductility combination after finalizing component manufacturing, in this case after expanding the tube crash box. For austenitic steels there are two different hardening mechanisms: the first hardening takes place during cold-forming including manufacturing and the second hardening takes place on crash impact during the lifetime of the component. Steels with a metastable austenitic microstructure have the hardening effect of TRIP (TRansformation Induced Plasticity) where the austenite changes into martensite during a forming load. Preferably for the method of the present invention steels with a fully austenitic microstructure having a so-called TWIP (TWinning Induced Plasticity) hardening effect, which is combined with a specific stacking fault energy (SFE) between 20 and 30 mJ/m² are used. The benefit of TWIP hardening austenitic steels is that during tube expanding, the microstructure stays in the initial ductile-austenitic condition without brittle martensitic phases and therefore the component has a homogeneous microstructure.

Further, austenitic stainless steels offer a significant higher corrosion resistance than low- or unalloyed steels because of their natural and repassivating chromium-oxide-surface layer. An additional dip-coating process of the component is thus avoided and the total costs of the crash box component are therefore reduced. In addition the life cycle environmental impact can be improved. The stainless steel crash box component is completely recyclable; it can be melted in an electric arc furnace at the end of the component's life.

The expanded tube crash box can be used in every motor vehicle, preferably inside a passenger car, but also inside trucks, buses or agricultural vehicles. It is further possible to adapt the method of the present invention by changing the thicknesses and diameters to higher values to enable usage inside railway vehicles. Moreover, the expanded tube crash box could be also integrated into crash barrier or guardrail systems as energy absorbing elements to protect intruding vehicles and their occupants during a collision.

BRIEF DESCRIPTION OF THE DRAWINGS

The present invention is illustrated in more detail referring to the attached drawings.

EMBODIMENTS ILLUSTRATING THE INVENTION

Figure 1:
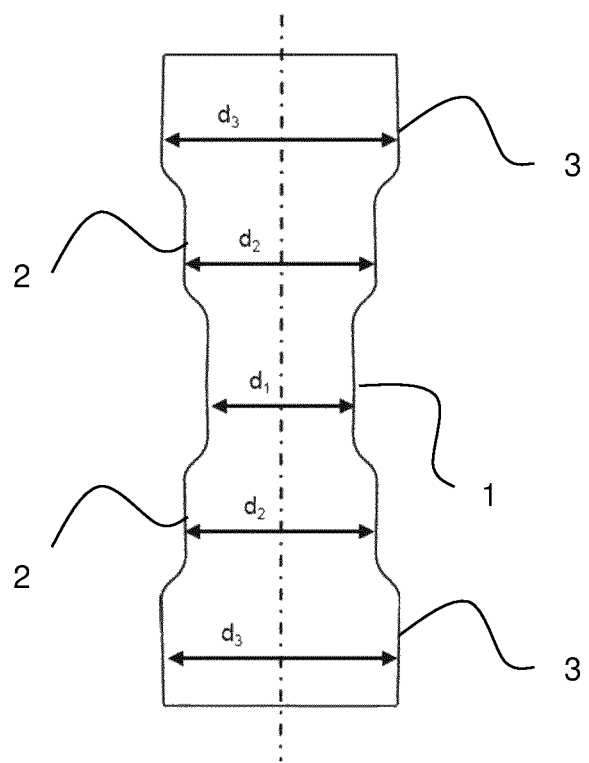
FIG. 1 shows one embodiment of the invention schematically seen from the side view.

FIG. 1 illustrates from the side view the expanded tube crash box after manufacturing. The dotted line demonstrates the longitudinal symmetry axis. In this embodiment of the present invention, there are three zones (1), (2), (3) symmetrical in transverse direction whereby the zone 1 (1) with the smallest diameter $d_1$ is located in the central zone. From the central to the longitudinal outsides, the zones increase in their diameter, demonstrated with the zone 2 (2) and zone 3 (3).

Figure 2:
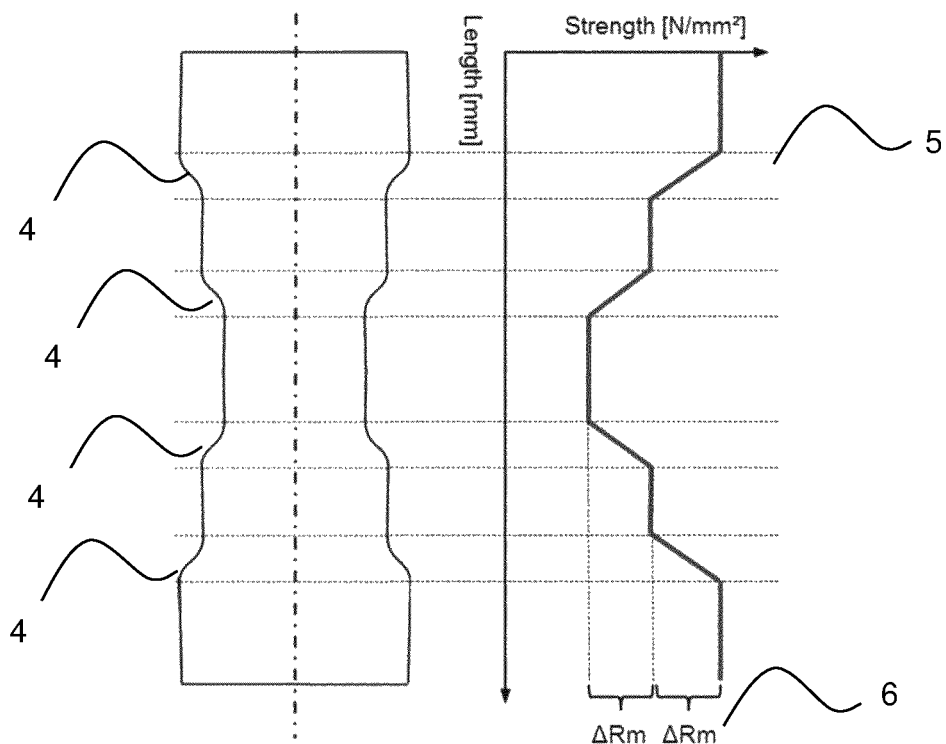
FIG. 2 shows the relation of the component strength depending to the longitudinal length of the component.
Figure 3:
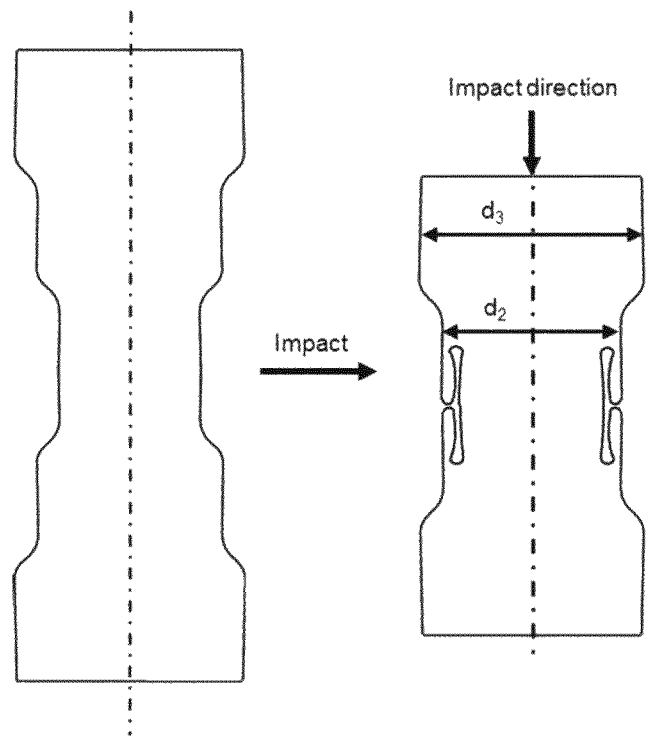
FIG. 3 shows from the side view the situation from the initial in the vehicle installed component geometry (left side) and the forming behavior during an impact situation (right side)

FIG. 2 illustrates for the component showed in FIG. 1 the relation of strength in longitudinal direction of the component with the different zones whereby transition zones (4) are located between the main zones (1), (2) and (3) from FIG. 1. The transversal dotted lines (5) demonstrate the starting points where a change of the zone and therefore a change in diameter and strength proceed. The zone 1 with the smallest diameter $d_1$ has the lowest strength level. With an increased diameter, the strength level increases, too. For the embodiment of FIG. 1 results that there exist two differences in strength named ΔRm (6). The difference in strength between each diameter is essentially the same FIG. 3 illustrates the forming behavior of the component during an impact situation from the longitudinal side whereby the zone with the lowest diameter, (1) from FIG. 1, and therefore the lowest strength level fold. The zones with the higher diameter will slide over the ones with the lower diameter depending on the particular strength levels.

Figure 4:
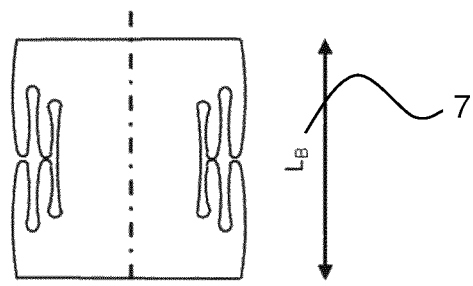
FIG. 4 shows from the side view the behavior of the component during an impact reaching the block length.

FIG. 4 illustrates the ongoing impact from FIG. 3 at its ending position called block length $L_B$ (7) where the energy absorption of the component is exhausted. The block length $L_B$ (7) is further equal with a residual safety area where other components can be located and will not be influenced by the impact.

Figure 5:
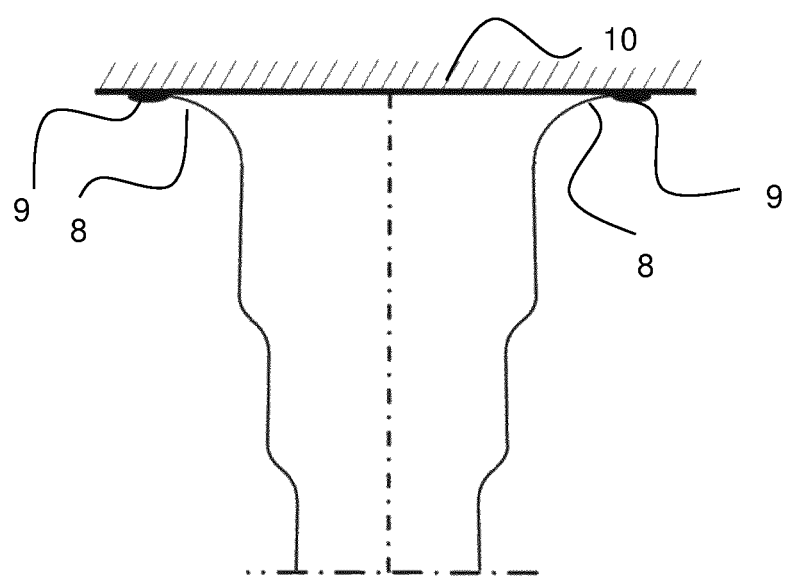
FIG. 5 shows from the side view the welding connection of the expanded tube to the neighboring vehicle parts.

FIG. 5 illustrates one preferred embodiment of the present invention where at least one end of the expanded tube is widened in a way that the end (8) is bent across the longitudinal axis of the tube crash box and its working direction to enable joining on the lap joint (9) to the neighboring vehicle parts (10). The joining can be executed as welding as a fillet or like mechanical joining as a lap joint like screwing.

The invention claimed is:

1. A motor vehicle crash box with a working direction in a vehicle's longitudinal axis, wherein the component is manufactured out of a tube which is made of an austenitic steel which has a homogeneous austenitic microstructure with a strain hardening effect even after forming, which is expanded by a forming process into an expanded tube having at least three zones, each zone having a different material strength and a different diameter;

wherein a center of the expanded tube in longitudinal direction works as a mirror axis and the zones are characterized in a way that starting from the outer-sides to the center, the diameter of each respective zone of the at least three zones decreases towards the center.

2. The motor vehicle crash box according to claim 1, wherein the zones have a strength [N/mm²] to diameter [mm] ratio of 6.0-9.0 N/mm³.

3. The motor vehicle crash box according to claim 1, wherein between the different zones is a minimum strength delta of $\Delta Rm \geq 75$ MPa.

4. The motor vehicle crash box according to claim 1, wherein the zones have a foldability which is inversely proportional to the diameter of the zone.

5. The motor vehicle crash box according to claim 1, wherein the expanded tube is configured to provide a residual safety area by reaching a block length of the system, preferably $L_\beta \geq 80$ mm after impact.

6. A method for manufacturing the motor vehicle crash box according to claim 1, wherein the tube is manufactured as a longitudinal-welded tube.

7. The method according to claim 6, wherein the tube is expanded by a mechanical drift expanding process in a mechanical drift expanding process machine.

8. The method according to claim 7, wherein the mechanical drift expanding process machine uses at least two different expanding mandrels for at least two different zones of the crash box.

9. The method according to claim 7, wherein the mechanical drift expanding process machine has a mirrored longitudinal axis to create a symmetrical crash box.

10. The method according to claim 6, wherein the tube is manufactured out of strain-hardenable austenitic stainless steels, having an initial yield strength $R_p 0.2 \geq 380$ MPa and an initial elongation $A_{80} \geq 40\%$.

11. The motor vehicle crash box according to claim 1, wherein at least one end of the expanded tube is widened to provide a flange around the circumference of the end of the tube, the flange being essentially perpendicular to the longitudinal axis of the tube crash box and its working direction, said flange providing a surface for attaching the crash box to a neighboring vehicle part.

12. The method according to claim 6, wherein the tube has an initial thickness of 0.8 mm$\leq t \leq$2.5 mm and the ratio of the initial diameter to the thickness is $24 \leq r_{d/t} \leq 125$.

13. The motor vehicle crash box according to claim 1, wherein the motor vehicle in which the crash box is integrated is a passenger car, a truck, a bus or an agricultural vehicle.

14. The motor vehicle crash box according to claim 1, wherein the crash box is an energy absorbing element in a crash barrier, guardrail or inside a railway vehicle.

* * * * *